US006914707B2

(12) United States Patent
Noe et al.

(10) Patent No.: US 6,914,707 B2
(45) Date of Patent: Jul. 5, 2005

(54) POLARIZATION SCRAMBLER, AND A METHOD FOR POLARIZATION SCRAMBLING

(75) Inventors: Reinhold Noe, Paderborn (DE); David Sandel, Paderborn (DE)

(73) Assignee: Siemens Aktiengesellschaft, Munich (DE)

(*) Notice: Subject to any disclaimer, the term of this patent is extended or adjusted under 35 U.S.C. 154(b) by 69 days.

(21) Appl. No.: 10/262,428

(22) Filed: Sep. 30, 2002

(65) Prior Publication Data

US 2003/0090764 A1 May 15, 2003

(30) Foreign Application Priority Data

Sep. 30, 2001 (DE) .......................................... 101 48 260

(51) Int. Cl.$^7$ ................................................. G02F 1/01
(52) U.S. Cl. ...................... 359/246; 359/281; 359/497; 359/900
(58) Field of Search ................................ 359/246, 281, 359/484, 494, 497, 900

(56) References Cited

U.S. PATENT DOCUMENTS

| 5,361,270 | A  | * | 11/1994 | Heismann ...................... 372/27 |
| 5,526,162 | A  | * | 6/1996  | Bergano ....................... 398/185 |
| 5,739,943 | A  | * | 4/1998  | Ohshima et al. ............ 359/281 |
| 6,101,297 | A  | * | 8/2000  | Nakaya ........................... 385/3 |
| 6,373,614 | B1 | * | 4/2002  | Miller ......................... 359/237 |
| 2003/0174400 | A1 | * | 9/2003 | Patel et al. .................. 359/498 |

FOREIGN PATENT DOCUMENTS

DE  4336742 A1 * 3/1995

OTHER PUBLICATIONS

Fred. Heismann, "Integrated–Optic Polarization Transformer for Reset–Free Endless Polarization Control", IEEE J. Quantum Elec. vol. 25, No. 8, pp. 1898–1906. Aug. 1989.*

Hok Yong Pua, et al., "An Adaptive First–Order Polarization–Mode Dispersion Compensation System Aided by Polarization Scrambling: Theory and Demonstration", IEEE J. Lightwave Techn., vol. 18, No. 6, pp. 832–841. Jun. 2000.*

F. Heismann, et al., "Electrooptic Polarization Scramblers for Optically Amplified Long–Haul Transmission Systems", IEEE Photonics Techn. Lett. vol. 6, No. 9, pp. 1156–1158. Sep. 1994.*

F. Heismann, "Compact Electro–Optical Polarization Scramblers for Optically Amplified Lightwave Systems", IEEE J. Lightwave Techn. vol. 14, No. 8, pp. 1801–1814. Aug. 1996.*

* cited by examiner

*Primary Examiner*—John Juba, Jr.
(74) *Attorney, Agent, or Firm*—Bell Boyd & Lloyd LLC

(57) ABSTRACT

A polarization scrambler, and associated method for polarization scrambling, is provided wherein light is passed through a time-variant retarder. At least after upstream connection or downstream connection of a time-invariant retarder, this time-variant retarder may be represented as a retarder with eigen modes which are uniformly distributed on the Poincaré sphere and with a delay of $5\pi/6$. An exemplary embodiment contains only two electro-optical wave plates, which are actuated by alternating signals containing harmonics. The polarization scrambler which is produced is independent of the input polarization of the light and can be used in devices for detection of polarization mode dispersion.

13 Claims, 2 Drawing Sheets

POLARIZATION SCRAMBLER, AND A METHOD FOR POLARIZATION SCRAMBLING

BACKGROUND OF THE INVENTION

Polarization mode dispersion, called PMD, has an adverse effect on high-speed optical data transmission. The Proceedings of the Optical Fiber Communication Conference OFC2001, Mar. 17–22, 2001, Anaheim, Calif., USA, Presentation PD27 disclosed a method for measurement of polarization mode dispersion in which a polarization scrambler is used which can produce a large number of output polarizations, or all possible output polarizations, from a specific input polarization. The output polarizations which can be produced define a three-dimensional, not only flat figure, within the Poincaré sphere. Further polarization scramblers are described in Electronics Letters, Volume 30 (1994)18, pages 1500–1501. These can produce a depolarized output signal from any desired input polarizations. At least for certain input polarizations, the output polarizations which are produced define, however, only a flat figure, and not a three-dimensional figure, within the Poincaré sphere, since depolarization is a necessary precondition, but not in itself a sufficient precondition, for output polarizations to actually be produced which define a three-dimensional figure, and not just a flat figure, within the Poincaré sphere.

Furthermore, ideally, the output polarizations which are produced should be uncorrelated; that is to say, the correlation matrix of the normalized Stokes vectors of the output polarization should be equal to ⅓ times the 3×3 unit matrix.

An object of the present invention is, thus, to specify a polarization scrambler, as well as an associated method for polarization scrambling, which emits uncorrelated output polarizations for any given input polarizations.

SUMMARY OF THE INVENTION

The problem is solved by designing a polarization scrambler such that, at least after upstream connection and/or downstream connection of a time-invariant retarder, the polarization scrambler can be regarded as a retarder with eigen modes which are uniformly distributed on the Poincaré sphere, and with a delay of $5\pi/6$.

In one exemplary embodiment of the present invention, this polarization scrambler is preferably in the form of three cascaded electro-optical wave plates. In a further exemplary embodiment of the present invention, it is preferably in the form of two cascaded electro-optical wave plates.

Additional features and advantages of the present invention are described in, and will be apparent from, the following Detailed Description of the Invention and the Figures.

DETAILED DESCRIPTION OF THE INVENTION

Without restriction to generality, all retarders are regarded as being loss-free in the following text, although the principle of the present invention also applies to lossy retarders. Retarders each have a pair of mutually orthogonally polarized eigen modes. To assist understanding, one of the two eigen modes is in each case referred to as the reference eigen mode in the following text. It is sufficient to quote the reference eigen mode, instead of both eigen modes, since the other eigen mode is simply the mutually orthogonal polarization. Any other eigen mode is subject to a phase delay in the retarder which is greater by the so-called delay of the retarder than that of the reference eigen mode which is otherwise identified or defined as the reference eigen mode by this statement. It is sufficient to consider delays in the main interval $-\pi \ldots \pi$, since the effect of two delays which differ by an integer multiple of $2\pi$ is identical.

It is also possible to take yet another step and to consider only positive values in the interval $0 \ldots \pi$ as delays. This is because negative values can be replaced by positive values when the two eigen modes are interchanged with one another.

The 3×3 submatrices of the Müller matrices of retarders are used in the following text to describe retarders, including rows and columns 1 to 3 which are associated with the Stokes vector components 1 to 3, with the numbering from 0 to 3 being used for the rows and columns in the Müller matrices and for the non-normalized Stokes vector components. The 3×3 submatrices accordingly have determinants whose magnitude is 1 or −1 and describe rotations, or mirror-image rotations, in the space of the normalized Stokes vectors. For the sake of simplicity, these are combined by the term rotation matrices in the following text. Normalized Stokes vectors are used to describe the input and output polarizations of retarders.

Figure 1:
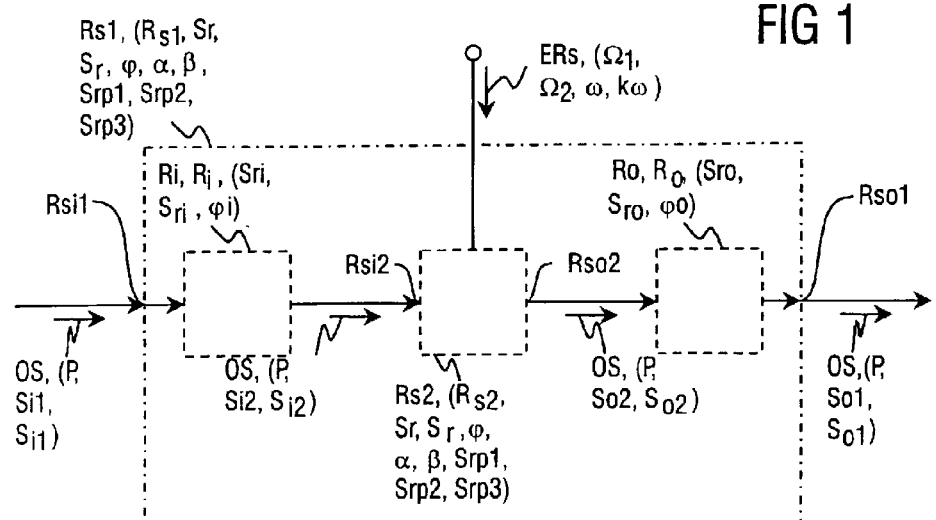
FIG. 1 shows a polarization scrambler according to the present invention.

In an arrangement according to the present invention for polarization scrambling as shown in FIG. 1, an optical signal OS is supplied at a first input Rsi1 to a first polarization scrambler Rs1, with a first input polarization Si1 as the polarization P. The polarization P of the optical signal OS is modulated as a function of time t in the first polarization scrambler Rs1. To this end, it is driven by at least one preferably electrical control signal ERs. The optical signal OS emerges from the first polarization scrambler Rs1 at a first output Rso1, with a first output polarization So1 as a polarization P.

The first polarization scrambler Rs1 possibly may be represented, at least using mathematical notation, or represented as a chain circuit on an input-side time-invariant retarder Ri with an input-side delay $\phi i$ as the delay and an input-side reference eigen mode Sri as the reference eigen mode, of a second polarization scrambler Rs2 and of an output-side time-invariant retarder Ro with an output-side delay $\phi o$ as the delay and an output-side reference eigen mode Sro as the reference eigen mode, through which the optical signal OS passes in this sequence. Input-side or output-side time-invariant retarders Ri, Ro also may be omitted or may have a zero delay.

The second polarization scrambler Rs2 has a second input Rsi2 as the input, at which the optical signal OS is fed in with a second input polarization Si2 as the polarization P, and a second output Rso2 as the output, at which the optical signal OS emerges with a second output polarization So2 as the polarization P.

Here and in the following text, designators such as $R_{s1}$, $R_{s2}$, with the same symbols as the designators for previously introduced polarization scramblers or retarders such as Rs1, Rs2, but which contain subscript suffices such as $_{s1, s2}$, denote the associated rotation matrices. Likewise, designators such as $S_{i1}$, $S_{o1}$, $S_{i2}$, $S_{o2}$ which are in the same form as designators for previously introduced polarizations such as Si1, So1, Si2, So2, but which contain subscript suffices such as $_{i1, o1, i2, o2}$, denote the associated normalized Stokes vectors.

The normalized Stokes vector $S_{o1}$, $S_{o2}$ of the first and second output polarizations So1, So2, respectively, of the first and second polarization scramblers Rs1, Rs2 respectively, according to the present invention has a respective correlation matrix $C=<S_{o1} \cdot S_{o1}^T>$ or $c=<S_{o2} \cdot S_{o2}^T>$ which is obtained by averaging of the respective product $S_{o1} \cdot S_{o1}^T$ or $S_{o2} \cdot S_{o2}^T$ of the corresponding normalized Stokes vector $S_{o1}$, $S_{o2}$ times its transposed $S_{o1}^T$, $S_{o2}^T$ with respect to time t. The correlation matrix C is at least approximately equal to ⅓ times the 3×3 unit matrix 1, C=(⅓)*1, to be precise independently of the existing first or second input polarization Si1, Si2.

The first and/or second polarization scramblers Rs1, Rs2 have an overall reference eigen mode Sr as the reference eigen mode, and an overall delay φ as the delay. According to the present invention, at least the first and possibly also the second polarization scrambler Rs1, Rs2 is in the form of an optical retarder with a Stokes vector Sr, which is at least approximately uniformly distributed on the Poincaré sphere, of the overall reference eigen mode Sr and with an overall delay φ of at least approximately 5π/6. An overall delay φ of −5π/6 is likewise possible and is taken into account in the following text by treating it as an overall delay φ of 5π/6 with the eigen modes at the same time being interchanged; that is to say, with the other eigen mode being chosen as the overall reference eigen mode Sr. Other overall delays φ which are possible according to the present invention, and modulo 2π are equal to 5π/6 or −5π/6, are regarded in the following text as being identical to these, and therefore are not discussed in their own right.

If the stated inventive features do not apply to the second polarization scrambler Rs2, then input-side and/or output-side time-invariant retarders Ri, Ro always can be chosen such that the inventive features apply to the first polarization scrambler Rs1.

Input-side and output-side time-invariant retarders Ri, Ro need not actually be present. However, they show that the overall invention follows a single standard idea.

A general retarder Rg has the general rotation matrix $$R_g = R_g(\varphi_g, S_{rg})$$

$$= \begin{bmatrix} S_{rg1}^2 + (S_{rg2}^2 + S_{rg3}^2)\cos\varphi_g & S_{rg1}S_{rg2}(1-\cos\varphi_g) - S_{rg3}\sin\varphi_g & S_{rg1}S_{rg3}(1-\cos\varphi_g) + S_{rg2}\sin\varphi_g \\ S_{rg1}S_{rg2}(1-\cos\varphi_g) + S_{rg3}\sin\varphi_g & S_{rg2}^2 + (S_{rg1}^2 + S_{rg3}^2)\cos\varphi_g & S_{rg2}S_{rg3}(1-\cos\varphi_g) - S_{rg1}\sin\varphi_g \\ S_{rg1}S_{rg3}(1-\cos\varphi_g) - S_{rg2}\sin\varphi_g & S_{rg2}S_{rg3}(1-\cos\varphi_g) + S_{rg1}\sin\varphi_g & S_{rg3}^2 + (S_{rg1}^2 + S_{rg2}^2)\cos\varphi_g \end{bmatrix},$$

which, in this case, without any restriction to generality, has a positive determinant +1. Its general reference eigen mode Srg is given by the normalized Stokes vector $$S_{rg} = [S_{rg1} \quad S_{rg2} \quad S_{rg3}]^T = \begin{bmatrix} S_{rg1} \\ S_{rg2} \\ S_{rg3} \end{bmatrix}$$

and its general delay is $\varphi_g$. For comparison: its Jones matrix is $$\begin{bmatrix} \cos\varphi_g/2 + jS_{rg1}\sin\varphi_g/2 & j(S_{rg2} + jS_{rg3})\sin\varphi_g/2 \\ j(S_{rg2} - jS_{rg3})\sin\varphi_g/2 & \cos\varphi_g/2 - jS_{rg1}\sin\varphi_g/2 \end{bmatrix}$$

and the general reference eigen mode Srg is also given by the Jones vector $$\frac{1}{\sqrt{2(1+S_{rg1})}} \begin{bmatrix} 1+S_{rg1} \\ S_{rg2} - jS_{rg3} \end{bmatrix}.$$

It is advantageous to define the overall reference eigen mode Sr in such a manner that its normalized Stokes vector $S_r$ denotes a point which preferably can be chosen as required on the surface of the Poincaré sphere in a specific polar coordinate system as a function of a longitudinal coordinate α, which lies in the interval 0 . . . 2π, and an azimuth coordinate β, which lies in the interval −π/2 . . . π/2. The uniform distribution according to the present invention of the normalized Stokes vector $S_r$ of the overall reference eigen mode Sr on the surface of the Poincaré sphere then preferably can be achieved, at least approximately, by choosing the longitudinal coordinate α to be at least approximately uniformly distributed in the interval 0 . . . 2π, by choosing the azimuth coordinate β to be at least approximately in the interval −π/2 . . . π/2 with a probability density function which is proportional to the cosine cos(β) of the azimuth component β, and by choosing the longitudinal coordinate α and the azimuth coordinate β to be at least approximately statistically independent. This results in a first, a second and a third parameter Srp1=cos(α)*cos(β), Srp2=sin(α)*cos(β), Srp3=sin(β), which are each uniformly distributed in the interval −1 . . . 1 and are uncorrelated in pairs. First, second and third parameters Srp1, Srp2, Srp3 are the components of the normalized Stokes vector $S_r$ of the overall reference eigen mode Sr in a Cartesian coordinate system with respect to which the longitudinal coordinate α and the azimuth coordinate β form a polar coordinate system.

There are a large number of different possible ways to vary the longitudinal coordinate α and the azimuth coordinate β as a function of the time t. For example, the longitudinal coordinate α is chosen in accordance with α=$\Omega_1$t, where $\Omega_1$ is a first angular velocity $\Omega_1$. The azimuth coordinate β is, for example, chosen in accordance with β=arc sin(2$\Omega_2$t/π) for −π/2≦$\Omega_2$t≦π/2 and in accordance with β=arc sin(−2($\Omega_2$t−π)/π) for π/2≦$\Omega_2$t≦3π/2 where $\Omega_2$t for the range determination is chosen modulo 2π in the interval −π/2 . . . 3π/2, and the function defined in this way is assumed to be an ideal function. In this case, $\Omega_2$ is a second angular velocity $\Omega_2$, whose magnitude |$\Omega_2$t| is chosen to be either very large or very small in comparison to the magnitude |$\Omega_1$| of the first angular velocity $\Omega_1$. In practice, a simpler function is generally chosen as the azimuth coordinate β, in which the high-frequency harmonics are attenuated or eliminated, at least as far as a specific order. A Fourier series β=0.944 sin($\Omega_2 t$), β=0.944 sin($\Omega_2 t$)−0.177 sin($3\Omega_2 t$), β=0.944 sin($\Omega_2 t$)−0.177 sin($3\Omega_2 t$)+0.081 sin($5\Omega_2 t$), β=0.944 sin($\Omega_2 t$)−0.177 sin($3\Omega_2 t$)+0.081 sin($5\Omega_2 t$)−0.049 sin($5\Omega_2 t$)

terminated after the first, third, fifth or seventh harmonic, for the ideal function are possible examples. In this case, it is advantageous to choose the magnitude $|\Omega_1|$ of the first angular velocity $\Omega_1$ to be equal to an integer multiple of the magnitude $|\Omega_2|$, $|3\Omega_2|$, $|5\Omega_2|$, $|7\Omega_2|$ of the highest multiple of the second angular velocity $\Omega_2$ which occurs in the terminated Fourier breakdown of the azimuth coordinate β.

Figure 2:
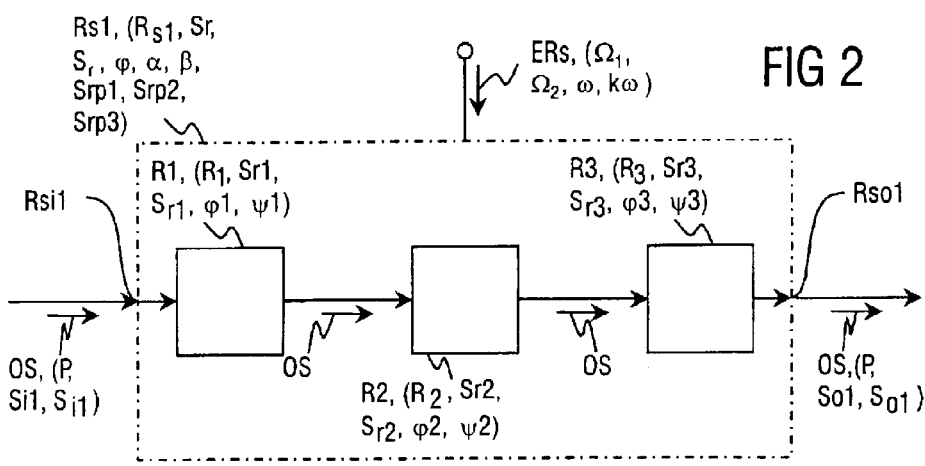
FIG. 2 shows an exemplary embodiment of a polarization scrambler according to the present invention.

In one exemplary embodiment of the present invention, as shown in FIG. 2, the first polarization scrambler Rs1 is in the form of a chain circuit of a first, a second and a third retarder R1, R2, R3. The first, second and third retarders R1, R2, R3 have a first, a second and a third delay ϕ1, ϕ2, ϕ3 and normalized Stokes vectors $S_{r1}$, $S_{r2}$, $S_{r3}$ for the first, second and third reference eigen modes Sr1, Sr2, Sr3 which can be varied as required on a great circle on the Poincaré sphere with a first, a second and a third angle coordinate ψ1, ψ2, ψ3. In this case, each angle coordinate ψ1, ψ2, ψ3 runs along the great circle in the interval 0 . . . 2π.

Such first, second and third retarders R1, R2, R3 are, for example, the electro-optical wave plates, which are known from Optics Letters 13(1988)6, pages 527–529, using LiNbO$_3$ with an X cut and Z propagation direction, in which the first, second and third reference eigen modes are linearly polarized and lie on the equator of the Poincaré sphere. Such first, second and third retarders R1, R2, R3 have the normalized Stokes vectors $$S_{1,2,3} = \begin{bmatrix} \cos\psi_{1,2,3} \\ \sin\psi_{1,2,3} \\ 0 \end{bmatrix}$$

for their first, second and third reference eigen modes Sr1, Sr2, Sr3.

Other options are general retarders, which have been described in the IEEE Journal of Quantum Electronics, Vol. 25, No. 8, August 1989, pages 1898–1906, and which can be produced using LiNbO$_3$ with an X cut and a Y propagation direction. Those general retarders contain three sets of electrodes for phase shifting, mode conversion in phase and mode conversion in quadrature, so that the first, second and third reference eigen modes can be chosen on any desired great circle on the Poincaré sphere. If one electrode set is omitted, then the remaining two electrode sets each define one of three mutually orthogonally aligned great circles on the Poincaré sphere as the locus of the first, second and third reference eigen modes. If, for example, only mode conversion in phase and in quadrature are allowed, then this results in normalized Stokes vectors $$S_{1,2,3} = \begin{bmatrix} 0 \\ \cos\psi_{1,2,3} \\ \sin\psi_{1,2,3} \end{bmatrix}$$

for the first, second and third reference eigen modes Sr1, Sr2, Sr3. Components such as these are also known from IEEE J. Quantum Electronics, 18 (1982) 4, pages 767–771.

According to the present invention, the second delay ϕ2 is chosen to be equal to ϕ2=5π/6. The first and third angle coordinates ψ1, ψ3 are chosen, according to the present invention, such that they differ by ±π/2 from the second angle coordinate ψ2, that is to say ψ1=ψ3=ψ2+π/2 or ψ1=ψ3=ψ2−π/2. First and third delays ϕ1, ϕ3 are, according to the present invention, equal and opposite to one another, that is to say ϕ1=−ϕ3, and are in each case chosen to lie in the interval −π/2 . . . π/2.

This results in the desired overall delay ϕ=5π/6 for the first polarization scrambler Rs1. Furthermore, the second angle coordinate ψ2 is chosen as the longitudinal coordinate α and the first delay ϕ1 is chosen as the azimuth coordinate β, so that this results in an overall reference eigen mode $S_r$, which is distributed uniformly on the surface of the Poincaré sphere.

Figure 3:
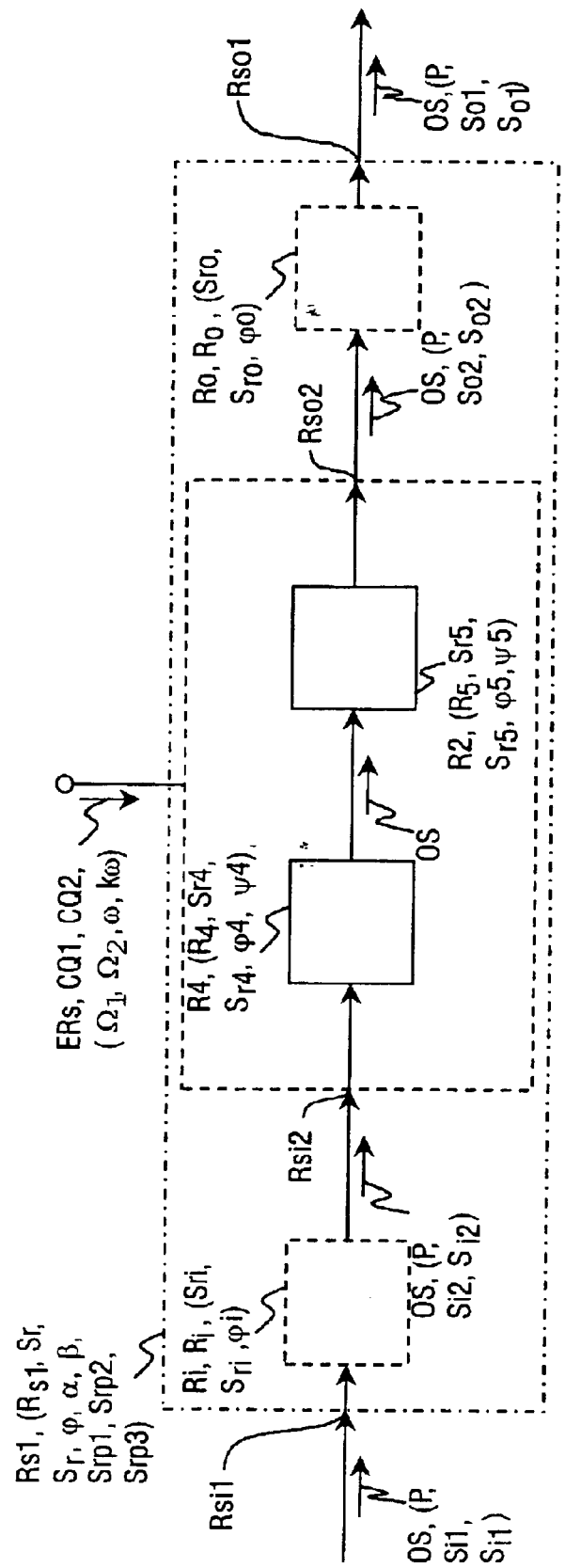
FIG. 3 shows a further exemplary embodiment of a polarization scrambler according to the present invention.

The correctness of this statement is evident, for example, for first, second and third retarders R1, R2, R3 which are in the form of wave plates, from the equation:

$R_{s1}(5\pi/6,[\cos(\alpha)\cos(\beta)\sin(\alpha)\cos(\beta)\sin(\beta)]^T) = R_3(-\beta,[\cos(\alpha+\pi/2)\sin(\alpha+\pi/2)0]^T)$ $R_2(5\pi/6,[\cos(\alpha)\sin(\alpha)0]^T)R_3(\beta,[\cos(\alpha+\pi/2)\sin(\alpha+\pi/2)0]^T)$ The first polarization scrambler Rs1 is once again shown in a further exemplary embodiment of the present invention in FIG. 3. As part of this, the second polarization scrambler Rs2 is in the form of a chain circuit of a fourth and a fifth retarder R4, R5 whose construction and characteristics are chosen to be analogous to the construction and characteristics of the first, second and third retarders R1, R2, R3.

According to the present invention, the longitudinal coordinate α plus the angle π/12 is chosen as the fourth angle coordinate ψ4; that is to say, ψ4=α+π/12. According to the present invention, the longitudinal coordinate α minus the angle π/12 is chosen as the fifth angle coordinate ψ5; that is to say, ψ5=α−π/12. According to the present invention, the fourth and fifth delays ϕ4, ϕ5 are chosen to be equal to the azimuth coordinate β plus π/2; that is to say, ϕ4=ϕ5=β+π/2.

The second polarization scrambler Rs2 formed in this way does not have a constant overall delay ϕ=5π/6, nor does it have a normalized Stokes vector $S_r$ of the overall eigen mode Sr distributed uniformly on the surface of the Poincaré sphere, but is nevertheless based on the principle according to the present invention. In order to verify this, the input-side and output-side time-invariant retarders Ri, Ro are chosen as retarders with the input-side and output-side delays ϕi=5π/12 and ϕo=5π/12, respectively, and the input-side and output-side reference eigen modes Si, So, respectively, whose normalized Stokes vectors $S_i$, $S_o$ are equal to the cross-product $S_i = S_o = S_{r4,\psi4=\pi/2} \times S_{r4,\psi4=0}$ of the normalized Stokes vector $S_{r4,\psi4=\pi/2}$ which results for ψ4=π/2 for the fourth reference eigen mode Sr4 and of the normalized Stokes vector $S_{r4,\psi4=0}$ which results for ψ4=0 for the fourth reference eigen mode Sr4; with the fourth delay ϕ4 in each case being subject to the condition 0<ϕ4<π. The fourth and fifth retarders R4, R5 are of the same type, so that FIG. 4 in the last sentence can be replaced by FIG. 5.

If the fourth retarder R4 is in the form of a wave plate, then by way of example, $S_{r4,\psi4=\pi/2} = [0\ 1\ 0]^T$, $S_{r4,\psi4=0} = [1\ 0\ 0]^T$, $S_i = S_o = S_{r4,\psi4=\pi/2} \times S_{r4,\psi4=0} = [0\ 0\ -1]^T$, so that the input-side and output-side time-invariant retarders Ri, Ro are circular retarders.

In consequence, the first polarization scrambler Rs1 has a constant overall delay ϕ=5π/6 and a normalized Stokes vector $S_r$, which is uniformly distributed on the surface of the Poincaré sphere, of the overall eigen mode Sr.

The correctness of this statement is evident, for example, for fourth and fifth retarders, R4, R5, which are in the form of wave plates, from the equation:

$R_{s1}(5\pi/6,[\cos(\alpha)\cos(\beta)\sin(\alpha)\cos(\beta)\sin(\beta)]^T) = R_o(5\pi/12,[0\ 0\ -1]^T)R_5(\beta+\pi/2,[\cos(\alpha-\pi/12)\sin(\alpha-\pi/12)0]^T)$.

$R_4(\beta+\pi/2,[\cos(\alpha+\pi/12)\sin(\alpha+\pi/12)0]^T)R_i(5\ \pi/12,[0\ 0\ -1]^T)$ Explained using the example of the general retarder Rg, there are a large number of general retarders Rg whose electrical control signals ERs are proportional to the general delay ϕg and are proportional to linear combinations of the cosine $\cos(\psi g)$ and of the sine $\sin(\psi g)$ of the general angle coordinate $\psi g$. This results in the necessity to find expressions for a first control variable $CQ1=(\beta+\pi/2)\cdot\cos(\alpha)$ and a second control variable $CQ2=(\beta+\pi/2)\cdot\sin(\alpha)$ which have as few harmonics as possible. According to the present invention, suitable expressions for the first and second control variables are:

$CQ1=(\beta+\pi/2)\cos(\alpha)=0.288\sin(\omega t)-1.196\sin(3\omega t)+0.846\sin(4\omega t)$ and $CQ2=(\beta+\pi/2)\sin(\alpha)=1.023\cos(\omega t)-1.446\cos(3\omega t)-0.534\cos(4\omega t)$.

In this case, $\omega$ is a further angular velocity, and t is the time. The first and second control variables CQ1, CQ2 give, at least approximately, a constant overall delay $\phi=5\pi/6$ and a normalized Stokes vector $S_r$, which is at least approximately uniformly distributed on the surface of the Poincaré sphere, of the overall eigen mode Sr for the polarization scrambler Rs1, Rs2. In the example of the second polarization scrambler Rs2, shown in FIG. 3, control variables which are linear combinations of the first and second control variables CQ1, CQ2 are required to produce the fourth and fifth retarders R4, R5 via lithium niobate modules and/or in accordance with Optics Letters 13(1988)6, pages 527–529 and/or the IEEE Journal of Quantum Electronics, Volume 25, No. 8, August 1989, pages 1898–1906, and/or the IEEE Journal of Quantum Electronics, 18(1982)4, pages 767–771. By way of example, the terms $(\beta+\pi/2)\cos(\alpha\pm\pi/12)$ and $(\beta+\pi/2)\sin(\alpha\pm\pi/12)$ can be calculated very easily via elementary trigonometric conversions, to be precise rotation through $\pm\pi/12$ in the plane which is defined by the first and second control variables CQ1, CQ2 as Cartesian coordinates. The required control voltages are also proportional to linear combinations of these terms $(\beta+\pi/2)\cos(\alpha\pm\pi/12)$ and $(\beta+\pi/2)\sin(\alpha\pm\pi/12)$.

Instead of those stated, other first and second control variables CQ1, CQ2 also may be used. Preferably, these are likewise terminated Fourier breakdowns relating to the further angular velocity $\omega$, so that first and second control variables CQ1, CQ2 formed in this way include the harmonic angular velocities $k\omega$, where k is an integer.

In addition to the described exemplary embodiments of the present invention, all other exemplary embodiments are suitable which can be formed by orthogonal transformation of the rotation matrix $R_{s1}$ of the first polarization scrambler Rs1. Instead of this, all unitary transformations would be permissible for a description via Jones matrices.

Polarization scramblers likewise are suitable which result from the described exemplary embodiments of the present invention by reversal of the beam path of the optical signal (OS), at least provided that all the components that are used are reciprocal.

Indeed, although the present invention has been described with reference to specific embodiments, those of skill in the art will recognize that changes may be made thereto without departing from the spirit and scope of the present invention as set forth in the hereafter appended claims.

What is claimed is:

1. A method for polarization scrambling having a polarization scrambler with a reference eigen mode and an overall delay $\phi$, through which an optical signal passes, the method comprising the steps of:

providing the polarization scrambler with a correlation matrix of a normalized Stokes vector, which corresponds to an output polarization which is produced, which is substantially equal to ⅓ times a 3×3 unit matrix; and connecting at least one of an input-side time-invariant retarder which is upstream and an output-side time-invariant retarder which is downstream, wherein the polarization scrambler serves as a retarder with a normalized Stokes vector of the reference eigen mode, which is substantially uniformly distributed on a Poincaré sphere, and of the overall delay $\phi$ which is substantially equal to $5\pi/6$.

2. A method for polarization scrambling as claimed in claim 1, wherein a longitudinal coordinate of the normalized Stokes vector of the reference eigen mode is formed in a polar coordinate system such that it is at least approximately uniformly distributed in an interval $0\ldots 2\pi$, and an azimuth coordinate ($\beta$) of the normalized Stokes vector of the reference eigen mode is formed such that, at least approximately, it has a probability density which is proportional to its cosine ($\cos(\beta)$) in an internal $-\pi/2\ldots\pi/2$.

3. A method for polarization scrambling as claimed in claim 2, wherein the longitudinal coordinate ($\alpha$) and the azimuth coordinate ($\beta$) are at least approximately statistically independent.

4. A method for polarization scrambling as claimed in claim 2, wherein a first, a second and a third parameter $Srp1=\cos(\alpha)*\cos(\beta)$, $Srp2=\sin(\alpha)*\cos(\beta)$, $Srp3=\sin(\beta)$ of the normalized Stokes vector of the reference eigen mode are in each case uniformly distributed in an interval $-1\ldots 1$ and are uncorrelated in pairs.

5. A method for polarization scrambling as claimed in claim 2, wherein the longitudinal coordinate ($\alpha$) is at least approximately equal to $\alpha=\cos(\Omega_1 t)$, where $\Omega_1$ is a first angular velocity ($\Omega_1$) and t is the time (t).

6. A method for polarization scrambling as claimed in claim 2, wherein the azimuth coordinate ($\beta$) is at least approximately equal to $\beta=\arcsin(2\Omega_2 t/\pi)$ for $-\pi/2\leq\Omega_2 t\leq\pi/2$ and equal to $\beta=\arcsin(-2(\Omega_2 t-\pi)/\pi)$ for $\pi/2\leq\Omega_2 t\leq 3\pi/2$ where $\Omega_2 t$ is chosen to be modulo $2\pi$ in an interval $-\pi/2\ldots 3\pi/2$ for range determination, $\Omega_2$ is a second angular velocity ($\Omega_2$) and t is the time (t).

7. A method for polarization scrambling as claimed in claim 6, wherein a magnitude ($|\Omega_2|$) of the second angular velocity ($\Omega_2$) is one of very large and very small in comparison to a magnitude ($|\Omega_1|$) of the first angular velocity ($\Omega_1$).

8. A method for polarization scrambling as claimed in claim 2, wherein in the polarization scrambler, the optical signal passes through a first, a second and a third retarder with a first, a second and a third delay ($\phi 1$, $\phi 2$, $\phi 3$) in one of this sequence and an opposite sequence, in that normalized Stokes vectors of the first, the second and the third reference eigen mode of the first, the second and the third retarders can be varied as required in the interval $0\ldots 2\pi$ at least approximately on a great circle on the Poincaré sphere with a first, a second and a third angle coordinate ($\psi 1$, $\psi 2$, $\psi 3$).

9. A method for polarization scrambling as claimed in claim 8, wherein the second delay ($\phi 2$) is chosen to be at least approximately equal to $\phi 2=5\pi/6$, in that the second angle coordinate ($\psi 2$) is chosen to be at least approximately equal to the longitudinal coordinate ($\alpha$), in that the first and the third angle coordinates ($\psi 1$, $\psi 3$) are each chosen to be at least approximately equal to the second angle coordinate ($\psi 2$) increased by $\pi/2$ ($\psi 1=\psi 3=\psi 2+\pi/2$), in that the first delay ($\phi 1$) is chosen to be at least approximately equal to the azimuth coordinate ($\beta$), and the third delay ($\phi 3$) is chosen to be at least approximately equal to the negative ($-\beta$) of the azimuth coordinate ($\beta$).

10. A method for polarization scrambling as claimed in claim 8, wherein in the polarization scrambler, the optical signal passes through a fourth and a fifth retarder with a fourth and a fifth delay ($\phi4, \phi5$) in one of this sequence and an opposite sequence, in that normalized Stokes vectors of the fourth and of the fifth reference eigen mode can be varied as required in the interval $0 \ldots 2\pi$ at least approximately on a great circle of the Poincaré sphere with a fourth and a fifth angle coordinate ($\psi4, \psi5$).

11. A method for polarization scrambling as claimed in claim 10, wherein the fourth angle coordinate ($\psi4$) is at least approximately equal to the longitudinal coordinate ($\alpha$) plus the angle $\pi/12$ ($\psi4=\alpha+\pi/12$), in that the fifth angle coordinate ($\psi5$) is at least approximately equal to the longitudinal coordinate ($\alpha$) minus the angle $\pi/12$ ($\psi5=\alpha-\pi/12$) and in that the fourth and the fifth delay ($\phi4, \phi5$) are at least approximately equal to the azimuth coordinate ($\beta$) plus $\pi/2$ ($\phi4=\phi5=\beta+\pi/2$).

12. A method for polarization scrambling as claimed in claim 10, wherein at least one control signal is proportional to a linear combination of a first control variable corresponding to $(\beta+\pi/2)\cdot\cos(\alpha)$ and of a second control variable corresponding to $(\beta+\pi/2)\cdot\sin(\alpha)$.

13. A method for polarization scrambling as claimed in claim 12, wherein the first control variable is at least approximately equal to $(\beta+\pi/2)\cos(\alpha)=0.288 \sin(\omega t)-1.196 \sin(3\omega t)+0.846 \sin(4\omega t)$ and in that the second control variable is at least approximately equal to $(\beta+\pi/2)\sin(\alpha)=-1.023 \cos(\omega t)-1.446 \cos(3\omega t)-0.534 \cos(4\omega t)$ where $\omega$ is a further angular velocity ($\omega$) and t is the time (t).

* * * * *